US005505847A

United States Patent [19]

Yamada et al.

[11] Patent Number: 5,505,847

[45] Date of Patent: Apr. 9, 1996

[54] WATER CIRCULATION SYSTEM FOR A MULTIPLE MINERAL BATH

[75] Inventors: Hajime Yamada; Akira Yamada, both of Nagareyama, Japan

[73] Assignee: CAC Corporation, Nagareyama, Japan

[21] Appl. No.: 337,744

[22] Filed: Nov. 14, 1994

[30] Foreign Application Priority Data

Jun. 28, 1994 [JP] Japan .................................... 6-168752

[51] Int. Cl.$^{6}$ ................................ A47K 3/00; C02F 1/46

[52] U.S. Cl. .......................... 210/169; 210/192; 210/202; 210/203; 210/266; 210/416.2; 4/541.1; 4/559; 204/268; 204/269; 204/276; 204/293

[58] Field of Search .................................... 210/169, 202, 210/203, 416.2, 198.1, 258, 275, 748, 192, 266; 4/541.1, 559; 204/268, 269, 275, 276, 293

[56] References Cited

U.S. PATENT DOCUMENTS

| | | | |
|---|---|---|---|
| 3,365,064 | 1/1968 | Horan, Jr. | 210/258 |
| 3,540,592 | 11/1970 | Derreumaux | 210/169 |
| 4,339,333 | 7/1982 | Sjöberg | 210/411 |
| 4,500,403 | 2/1985 | King | 204/268 |
| 4,790,923 | 12/1988 | Stillman | 204/268 |
| 4,829,607 | 5/1989 | Huse | 4/541.1 |
| 5,256,268 | 10/1993 | Goto et al. | 204/268 |
| 5,279,748 | 1/1994 | Hackett | 210/202 |

FOREIGN PATENT DOCUMENTS

| | | | |
|---|---|---|---|
| 64-34416 | 2/1989 | Japan | 4/559 |
| 1-266820 | 10/1989 | Japan | 4/559 |
| 2-12443 | 3/1990 | Japan . | |
| 3-000191 | 1/1991 | Japan | 4/559 |
| 3-106492 | 5/1991 | Japan | 4/559 |
| 3-240730 | 10/1991 | Japan . | |
| 1261599 | 10/1986 | U.S.S.R. | 210/169 |

*Primary Examiner*—Peter A. Hruskoci
*Assistant Examiner*—Theodore M. Green
*Attorney, Agent, or Firm*—Pearne, Gordon, McCoy & Granger

[57] ABSTRACT

The present invention is a bath which circulates and recycles a multiple mineral solution. The solution is released from the bathtub, filtered at the hair collector and the filtration device, sterilized at the electrolytic sterilizer, and returned to the tub. Non-metallic pipe is used along the circulation route. The electrolytic sterilizer employs several electrode panels which are placed perpendicular to the direction of flow of the solution. The filtration device features a rubber lining in the portions which come into contact with the solution, and has inside of it a dish onto which is lain filter sand. With the use of this invention, it becomes possible to repeatedly use and reuse a highly viscous solution containing multiple minerals as the recycling fluid, jams become infrequent, the filtration and reverse cleansing procedures become less time consuming, and the solution can be effectively sterilized.

4 Claims, 5 Drawing Sheets

WATER CIRCULATION SYSTEM FOR A MULTIPLE MINERAL BATH

BACKGROUND OF THE INVENTION

1. Field of the Invention

The present invention relates primarily to a water circulation system for a multiple mineral bath which is suitable for the stimulation of the cells of the skin and nasal cavity.

2. Related Technology

The present inventor has, in the past, invented mineral solutions for the stimulation of skin cells (Japanese Patent No. 1597430 and Japanese Patent Laid-Open No. Hei 3-240730). These mineral solutions, absolutely without the fear of side effects, are able to stimulate the cells of the skin and the nasal cavity, and are remarkably effective in treating baldness, pigmentation, and various ailments such as stomatitis and hay fever. In addition, upon further research, the inventor discovered that the solutions were most effective when used in a bath.

As filtration devices for water circulation baths of the prior art, the "Sterilization Apparatus For Use With Bathtubs" given in Japanese Patent Laid-Open No. Hei 2-108794 and the "Bath Water Sterilization and Cleansing Apparatus" given in Japanese Patent Laid-Open No. Hei 3-192 are to be mentioned. Both are apparatuses which sterilize and filter the water while the bath water circulates.

However, in order to use the special solution which contains multiple minerals with the circulation baths of the prior art, many problems remained.

First, the metallic portions of the circulation devices tend to corrode quickly, and they become unusable in three to six months.

Second, the time required for the filtration of the mineral solution increases greatly. That is, because the mineral solution used for the bath has a much higher viscosity than the water usually used for baths, jams result in several points in the filtration device, and the required filtration time lengthens. Furthermore, for the same reason, the reverse washing procedure inside the the filtration device also requires more time.

Third, when sterilizing the multiple mineral solution, the sterilization devices of the prior art are less effective. For example, if the number of bacteria in bath water using normal hot water is $1\times10^8$ per ml, the limit to which the bacteria can be held upon sterilization by the sterilization devices of the prior art is a bacterial count of $9\times10^5$. Accordingly, for the sterilization of the multiple mineral solution, the effectiveness of the sterilization becomes further minimized to the point of impracticality.

SUMMARY OF THE INVENTION

In light of the above-mentioned limitations of the prior art, the present invention has as its object the production of a water circulation system for a multiple mineral solution bath which has as its features the ability to repeatedly use highly viscous solutions containing multiple minerals as circulatory fluid, the elimination of jamming, the requirement of only short time durations for the filtration and reverse cleansing procedures, and sufficient effectiveness in sterilization.

DETAILED DESCRIPTION OF THE INVENTION

In order to meet the objectives given above, the circulation system circulates the multiple mineral solution released from the bathtub through non-metallic pipes, through a hair collector and a filtration device, sterilizes the solution using an electrolytic sterilization device and returns the solution to the tub. The electrolytic steriliaztion device employs several electrode panels which lie perpendicular to the direction of flow. The filtration device consists of a cylinder, the pans of which come into contact with the solution having a rubber lining, the inside of which is provided with a dish upon which is laid sand for use as a filter, a hair collector being applied on the circulation route between the upper part and the lower part of the portion above the sand, and a reverse cleansing circulation route being provided beneath the sand.

In an embodiment of the invention, the filtration device uses stainless steel lined with rubber in the portions where it comes into contact with the solution, and in the hair collector uses vinyl chloride where it comes into contact with the solution, in order to eliminate corrosion.

In another embodiment, the electrolytic sterilization device uses an electrode panel composed of a titanium alloy and formed into a mesh, through which a current of 1 to 3 amperes is run. In such a case, oxygen is produced at the positive electrode due to electrolysis. The electrons in the oxygen atoms go from the ground state to an excited state. In this case, the composition and construction of the electrode panel lowers the energy threshold of the excited oxygen, and can be thought of as acting as a catalyst. The excited oxygen oxidizes the cell walls of the bacteria, forms a radical molecule, and kills off the bacteria.

In yet another embodiment, for the mineral solution, bath water with dextran, glucose, and sodium chloride is used.

In the final embodiment, for the mineral solution, one or more of the following; pullulan, starch sulfate, mannitol, dextrin, cyclodextrin, carrageenan, mutan, lentinan, calcium chloride, and hydroethyl starch; is added.

DESCRIPTION OF THE PREFERRED EMBODIMENTS OF THE INVENTION

Following is a detailed discussion of the preferred embodiments of the present invention using the figures as a reference.

Figure 1:
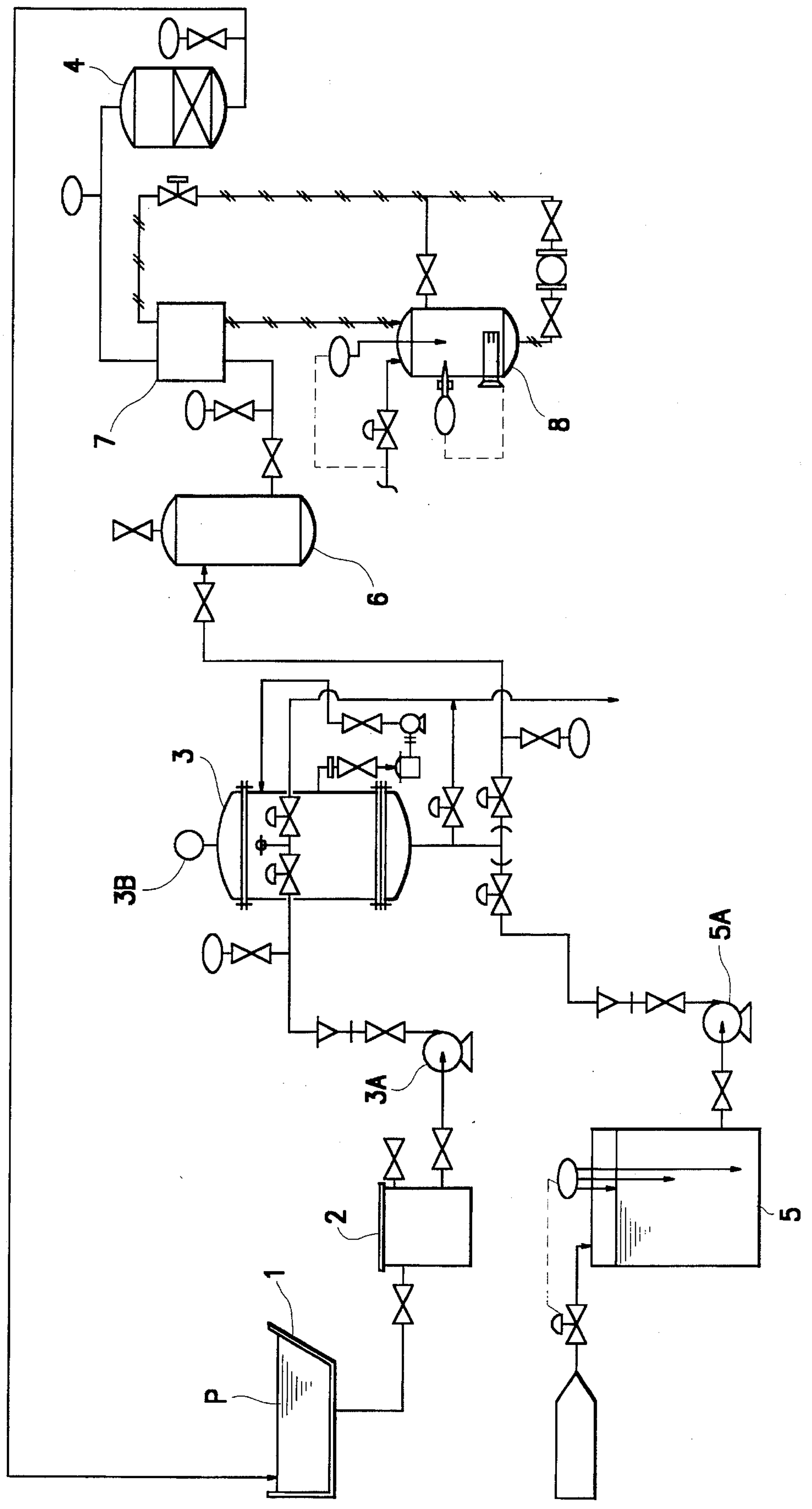
FIG. 1: An outline of the first preferred embodiment of the present invention.

FIG. 1 shows the present invention according to the first preferred embodiment. Reference numeral (1) represents the bathtub which uses a multiple mineral solution as the bathing water. The solution which is released from the tub (1) after use is mused after circulation through hair collector (2), filtration device (3), and electolytic sterilization device (4). For the pipes in the circulation mute, non-metallic pipes are used. In this case, tile use of plastic materials such as vinyl chloride for the non-metallic pipes is planned, but it is also possible to use other non-metallic materials which can withstand corrosion, such as ceramics.

Hair collector (2) uses vinyl chloride on the parts which come into contact with the solution. The solution which is released from the tub (1) first passes through hair collector (2) and then is moved by filtration pump (3A) to the filtration device (3).

Filtration device (3) is made of stainless steel, and inside the tank, the portion which contacts the solution has a rubber lining. In this case, the use of SS-41 with a rubber lining is planned. As shown in the figure, the reverse cleansing tank (5) is attached to the filtration device (3). In addition, the solution which has passed through the filtration device (3) circulates to the electrolytic sterilizer (4).

In this case, solution reaches the electrolytic sterilizer (4) through cartridge filter (6). Cartridge filter (6) is made from vinyl chloride identically with the hair collector (2). Additionally, between the cartridge filter (6) and the electrolytic sterilizer (4), the temperature of the circulating solution is able to be controlled through heat transfer device (7) and hot water tank (8).

Figure 2:
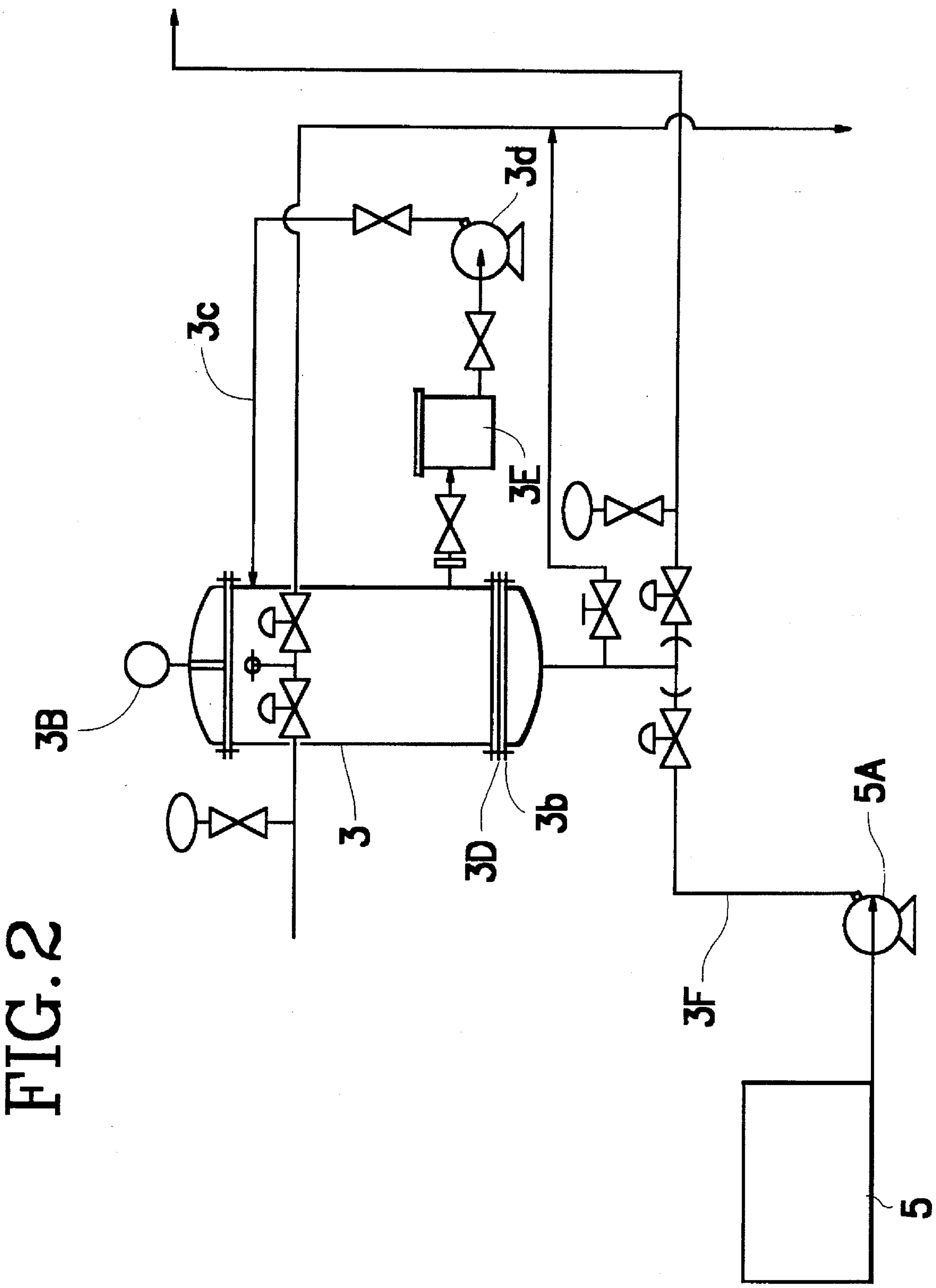
FIG. 2: An outline of the filtration device of the present invention.

FIG. 2 shows the filtration device (3) of the present invention. Inside the filtration device (3), sand for use in filtration is kept. This filter sand is laid upon the dish (3D) attached to the inside of filtration device (3), and filters the solution which flows from the upper portion to the lower portion of the filtration device (3). As shown in the diagram, dish (3D) is located next to the flange (3*b*) of filtration device (3). Additionally, in the upper portion of the filtration device (3), an agitator (3B) for the agitation of the inside of the filtration device (3) is attached.

Hair collector (3E) is attached above the filter sand, on circulation passage (3*c*). Reference numeral (3*d*) represents the circulation pump. The use of PVC material for hair collector (3E) is planned.

Reverse cleansing circulation route (3F) is attached to the tank underneath the filter sand. This reverse cleansing circulation route (3F) is connected to the reverse cleansing tank (5) through reverse cleansing pump (5A).

Figure 3:
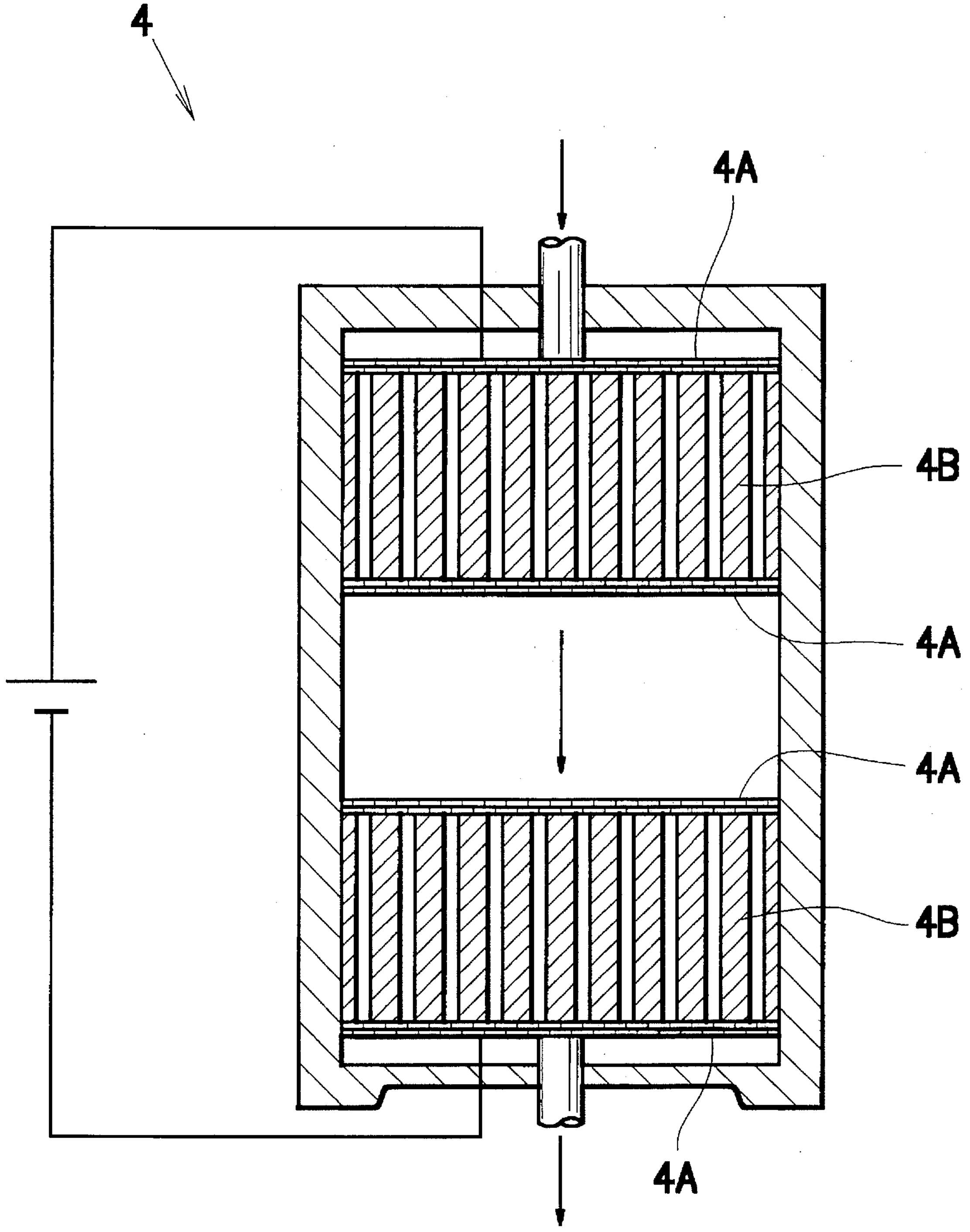
FIG. 3: A side view of the electrolytic sterilizer of the present invention.

FIG. 3 shows electrolytic sterilizer (4). This electrolytic sterilizer (4) contains several electrode panels (4A) lain perpendicular to the direction of water flow. In the figure, four such electrode panels (4A) are shown. Between electrode panels (4A) of opposite polarity, graphite (4B) provided with holes is placed is a spacer.

Figure 4:
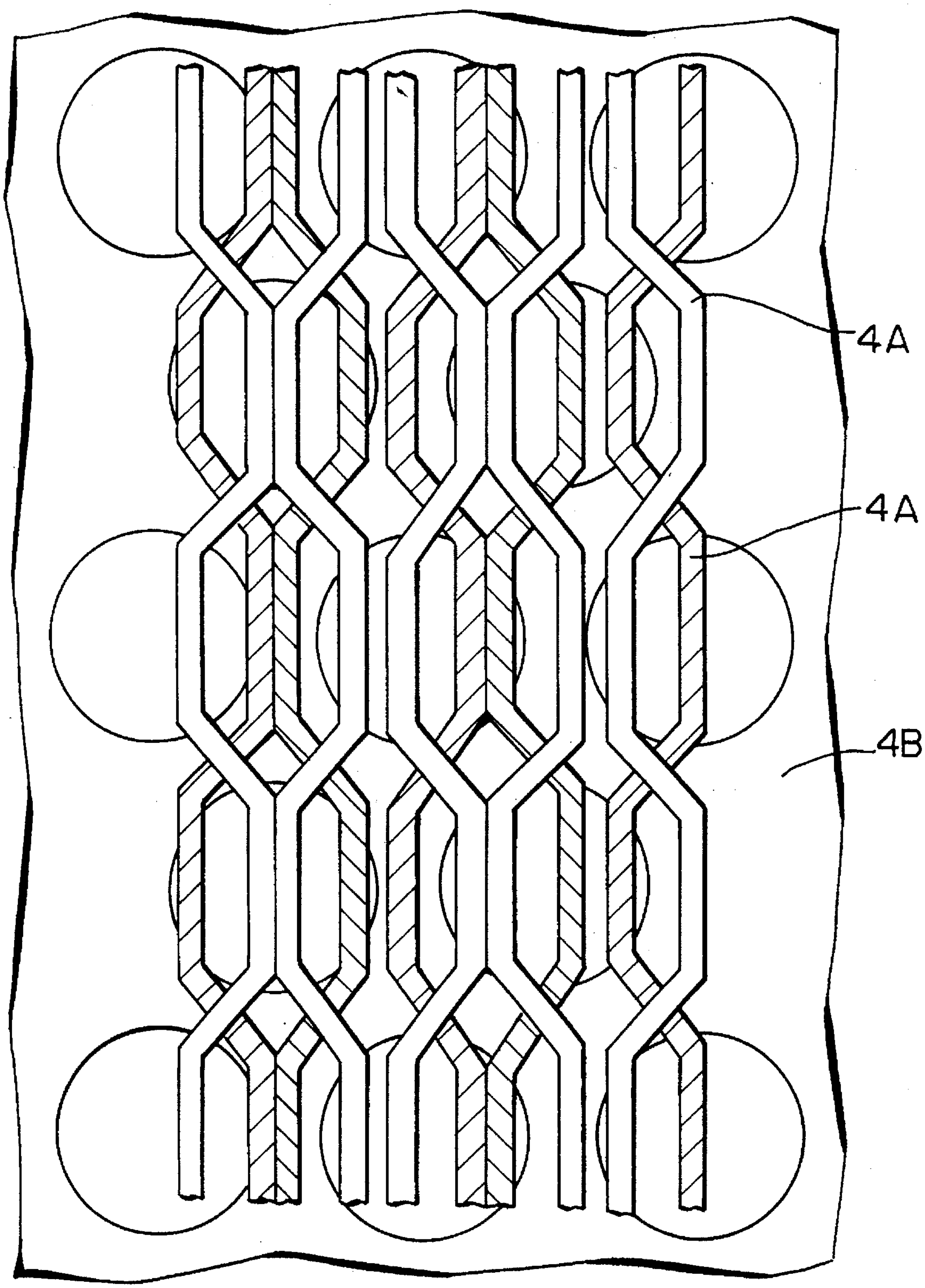
FIG. 4: An enlarged top view of the electrode panels of the electolytic sterilizer.

The electrode panels (4A) are constructed in a mesh fashion and composed of a titanium alloy (see FIG. 4). As shown in the figure, the electrode panels are put together so as to interchange the positions of the holes in the mesh.

Chart 1 shows the experimental results if four electrode panels (4A) of thickness 2 mm with a spacing of 25 mm are used. The electrolytic sterilizer (4) was provided with a voltage of 2.8V/cell, a current of 2.0A, and a flow rate of 1.3 l/min and the data was measured continuously over time. It was shown that the number of bacteria in the solution P could be drastically reduced from $2.1\times10^3$ per ml to 65 per ml.

Chart 2 shows the results if the same conditions are applied to a solution P from which sodium chloride has been removed. In this case, with the number of electrode panels is increased to six, the number of bacteria could be reduced from $2.3\times10^3$ per ml to 66 per ml.

The primary condition for the effectiveness of the sterilization procedure of the present invention is the amount of current flowing through the fluid; a power input of 20 to 80W and a current of 1 to 3A at each electrode panel (4A) seems to be ideal. However, there is the possibility that the amount could change depending on the shape and composition of the electrode panels (4A).

The multiple mineral solution contains dextran, glucose, and sodium chloride; and, depending on the situation, pullulan, sulfate starch, mannitol, dextran, cyclodextran, carrageenan, mutan, lentinan, calcium sulfate, or hydroethyl starch may be added.

Figure 5:
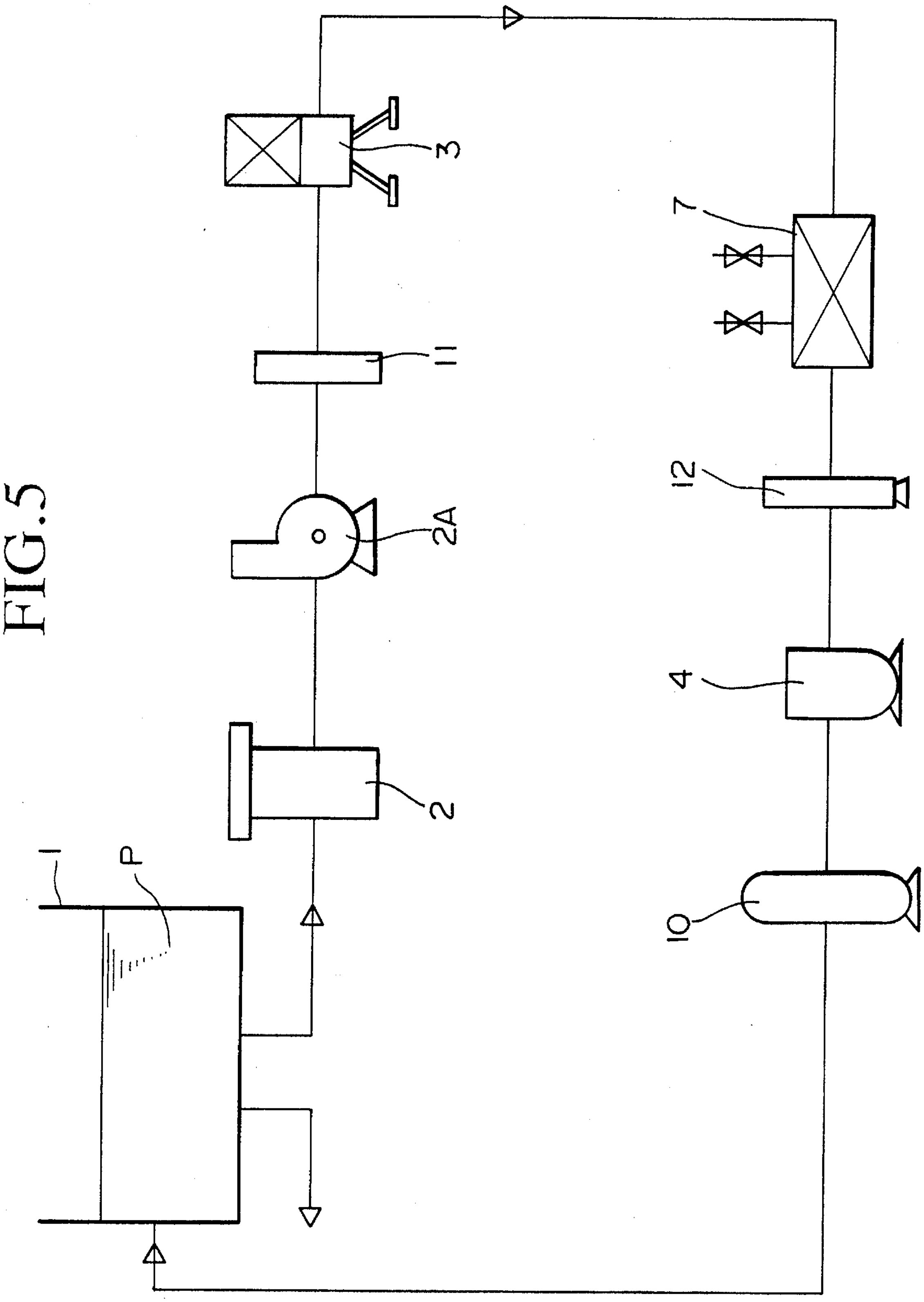
FIG. 5: An outline of the second preferred embodiment of the present invention.

FIG. 5 shows another preferred embodiment of the present invention, in which the solution P goes from the hair collector (2) to the pump (2A), through the flow measure (11) and gets filtered at filtration device (3). The solution which has been filtered at the filtration device (3) flows through the heat transfer device (7) and the chlorine sterilizer (12), then gets sterilized at the electrolytic sterilizer (4), and returns to the tub (1) through filter (10).

What is claimed is:

1. A circulatory bathing system for use with a multiple mineral solution which has as its principal features:

(a) pipe means, composed of non-metallic material, for circulating solution released from a bathtub;

(b) an electrolytic sterilizer for disinfecting said solution, comprising several electrode panels lying perpendicular to the direction of fluid flow;

(c) a hair collector for removing hair from said solution; and (d) a filtration device for removing impurities in the solution, comprising a cylinder provided with a rubber lining on portions thereof which contact said solution, a dish provided inside said cylinder onto which is lain sand for filtering said solution, a circulatory route provided above said filter sand connecting to said hair collector, and a reverse cleansing route provided below said filter sand, wherein said electrode panels of said electrolytic sterilizer comprise a titanium alloy and are constructed in a mesh shape, and an electric current of between about 1 to 3A flows through said electrode panel.

2. A circulatory bathing system for use with a multiple mineral solution according to claim 1, wherein stainless steel provided with a rubber lining is used as the material for portions of the filtration device which contact said solution, and vinyl chloride is used as the material for portions of the hair collector which contact said solution.

3. A circulatory bathing system for use with a multiple mineral solution according to either of claims 1 or 2, wherein the multiple mineral solution is bath water containing dextran, glucose, and sodium chloride.

4. A circulatory bathing system for use with a multiple mineral solution according to claim 3, wherein the multiple mineral solution further contains one or more of the following: pullulan, sulfate starch, mannitol, dextrin, cyclodextrin, carrageenan, mutan, lentinan, calcium chloride, or hydroethyl starch.

* * * * *

UNITED STATES PATENT AND TRADEMARK OFFICE

CERTIFICATE OF CORRECTION

PATENT NO. : 5,505,847

DATED : April 9, 1996

INVENTOR(S) : Yamada et al.

It is certified that error appears in the above-indentified patent and that said Letters Patent is hereby corrected as shown below:

Column 2, line 20, delete "pans" and insert --parts--;

line 61, delete "mused" and insert --reused--;

line 63, delete "mute" and insert --route--; and line 64, delete "tile" and insert --the--.

Column 3, line 44, delete "is" and insert --as--.

Column 4, line 16, delete "measure" and insert --measurer--; and line 44 (Claim 1, line 21), delete "panel" and insert --panels--.

Signed and Sealed this

Sixteenth Day of July, 1996

Attest:

Bruce Lehman

BRUCE LEHMAN

*Attesting Officer*

*Commissioner of Patents and Trademarks*